(12) United States Patent
Mairesse et al.

(10) Patent No.: US 9,484,021 B1
(45) Date of Patent: Nov. 1, 2016

(54) DISAMBIGUATION IN SPEECH RECOGNITION

(71) Applicant: Amazon Technologies, Inc., Seattle, WA (US)

(72) Inventors: Francois Mairesse, Arlington, MA (US); Paul Frederick Raccuglia, Cambridge, MA (US); Shiv Naga Prasad Vitaladevuni, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 42 days.

(21) Appl. No.: 14/673,089

(22) Filed: Mar. 30, 2015

(51) Int. Cl.
*G10L 17/00* (2013.01)
*G10L 15/08* (2006.01)
*G10L 15/22* (2006.01)
*G10L 15/02* (2006.01)
*G10L 15/00* (2013.01)

(52) U.S. Cl.
CPC ............... *G10L 15/08* (2013.01); *G10L 15/02* (2013.01); *G10L 15/22* (2013.01); *G10L 15/00* (2013.01); *H05K 999/99* (2013.01)

(58) Field of Classification Search
CPC ..... H05K 999/99; G10L 15/22; G10L 15/30; G10L 15/16; G10L 15/02; G10L 15/08; G10L 15/00; G10L 15/15265; G10L 15/187; G10L 15/197; G10L 25/30; G10L 17/02; G10L 17/005
USPC ....... 704/231, 232, 236, 237, 238, 239, 240, 704/246, 249, 250, 251, 254, 255, 257, 270, 704/275
See application file for complete search history.

*Primary Examiner* — Vu B Hang
(74) *Attorney, Agent, or Firm* — Seyfarth Shaw LLP; Ilan N. Barzilay

(57) ABSTRACT

Automatic speech recognition (ASR) processing including a two-stage configuration. After ASR processing of an incoming utterance where the ASR outputs an N-best list including multiple hypotheses, a first stage determines whether to execute a command associated with one of the hypotheses or whether to output some of the hypotheses of the N-best list for disambiguation. A second stage determines what hypotheses should be included in the disambiguation choices. A first machine learning model is used at the first stage and a second machine learning model is used at the second stage. The multi-stage configuration allows for reduced speech processing errors as well as a reduced number of utterances sent for disambiguation, which thus improves the user experience.

20 Claims, 10 Drawing Sheets

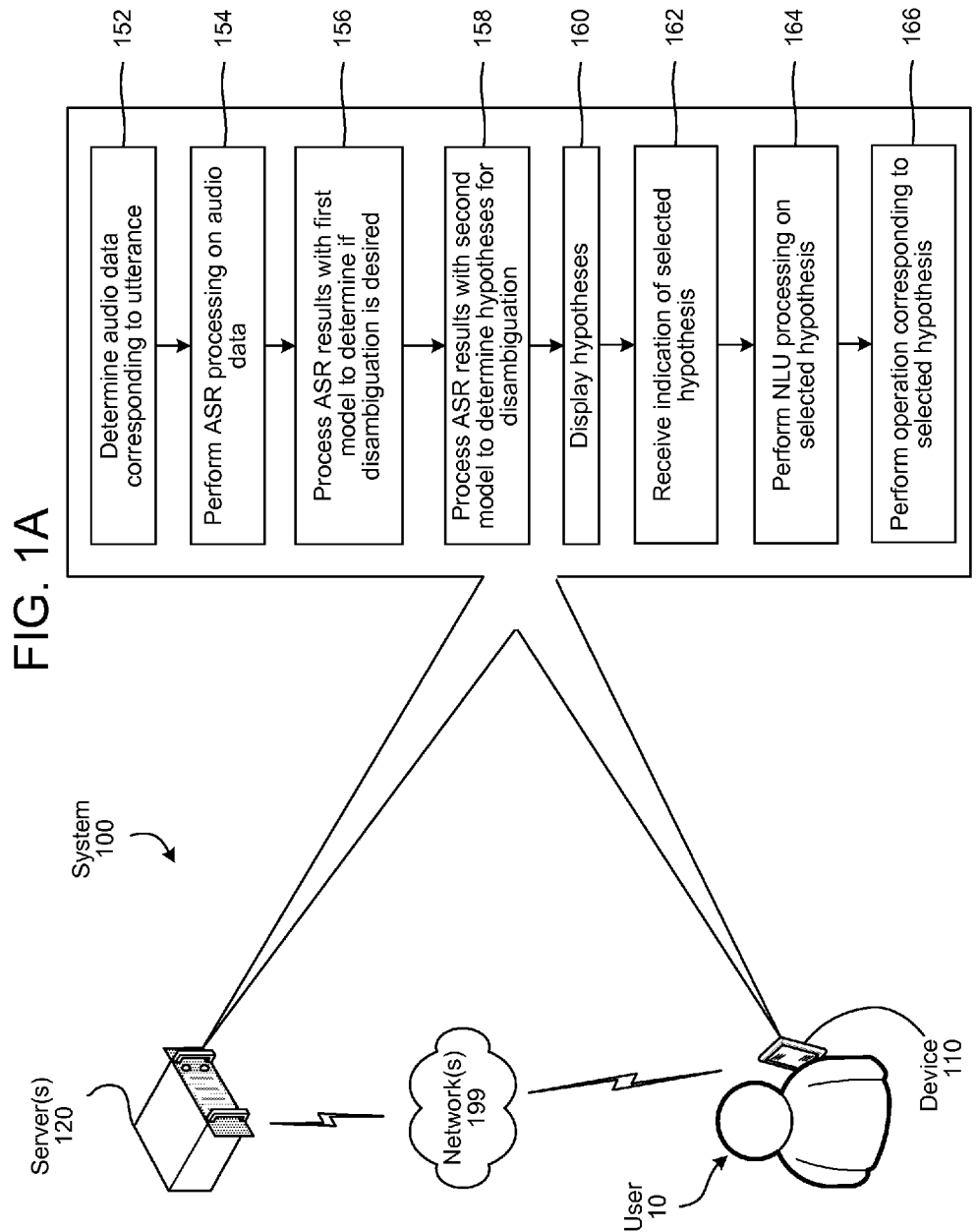

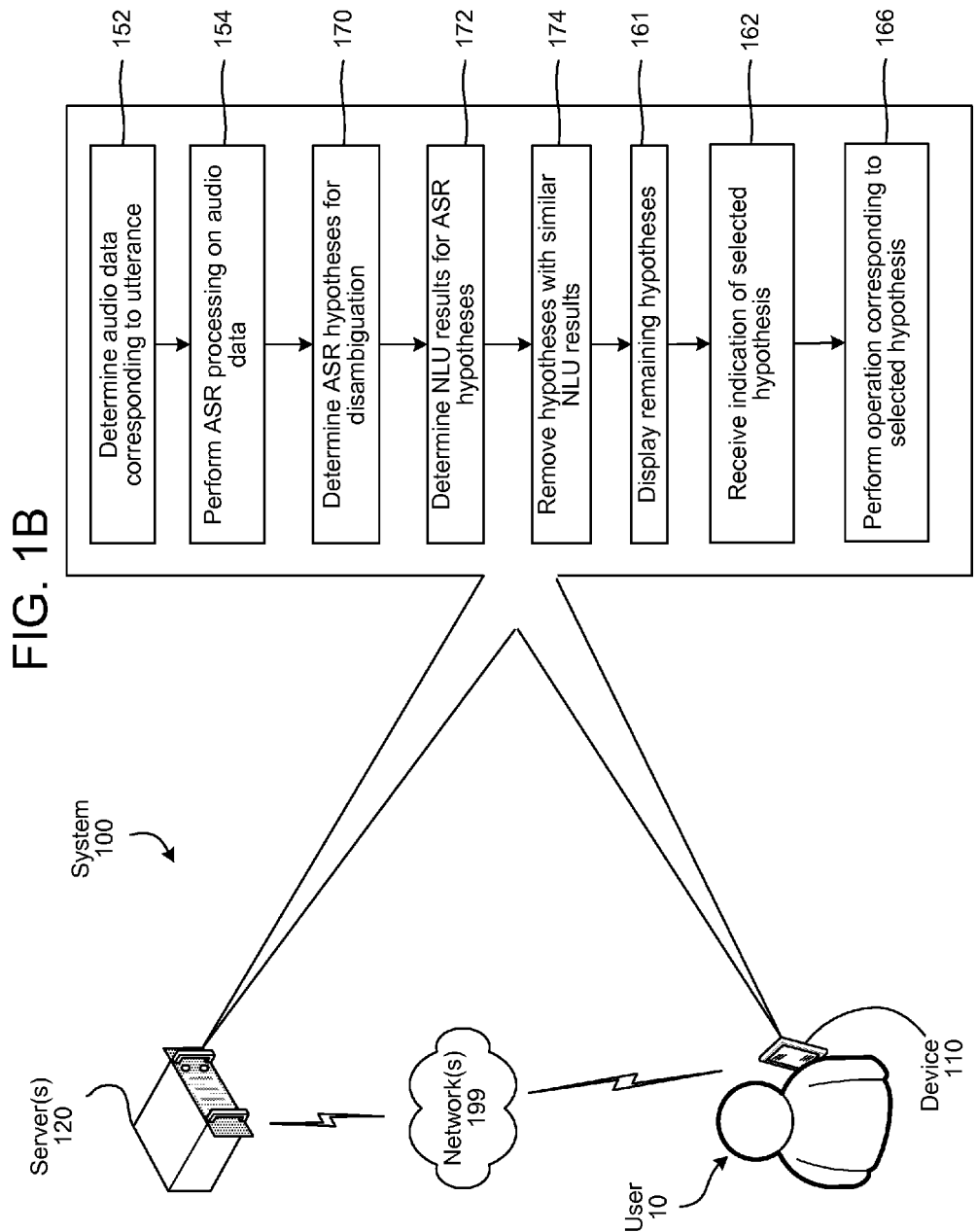

US 9,484,021 B1

DISAMBIGUATION IN SPEECH RECOGNITION

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B illustrate a system for automatic speech recognition (ASR) according to embodiments of the present disclosure.

DETAILED DESCRIPTION

Figure 2:
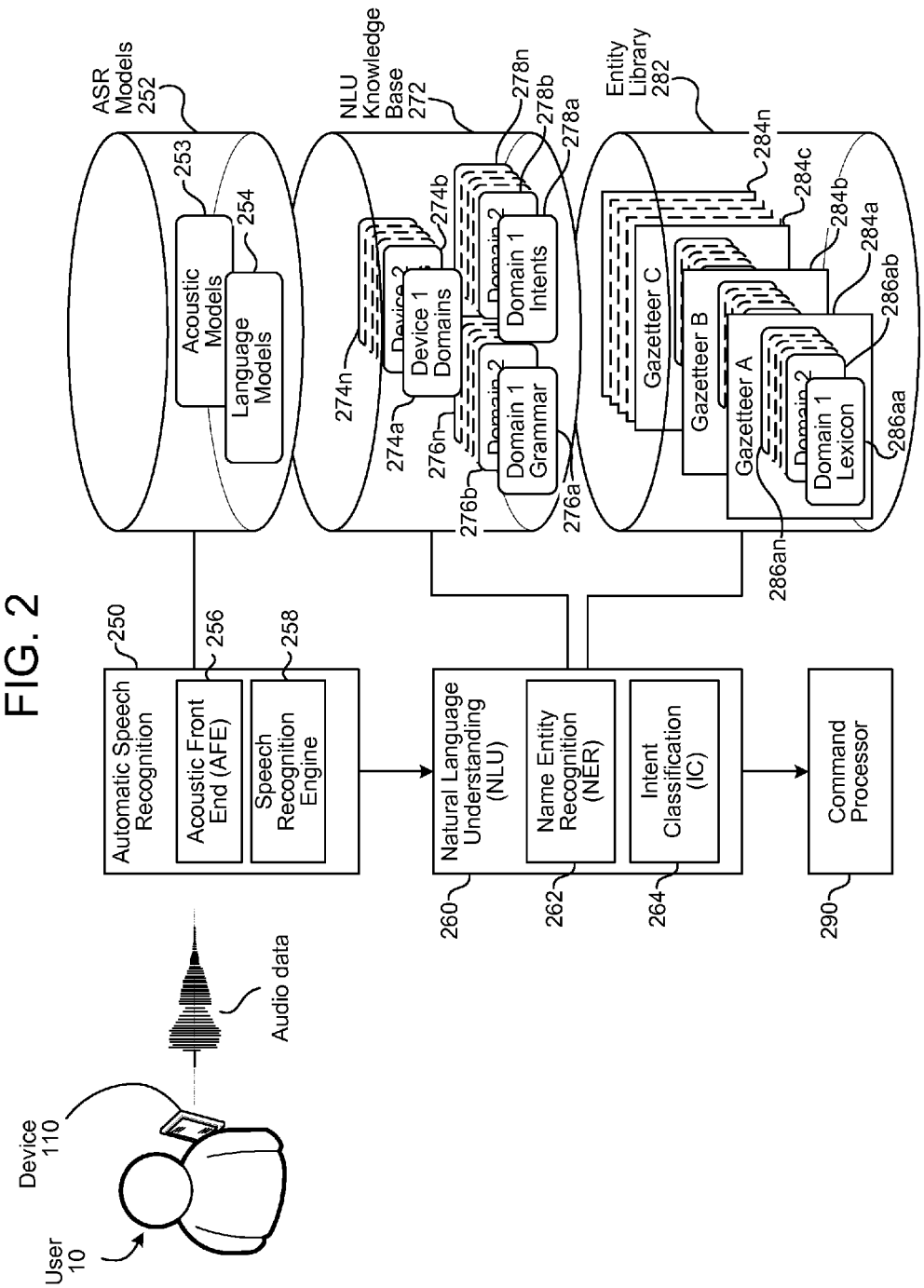
FIG. 2 is a conceptual diagram of how a spoken utterance may be processed according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

Often a spoken command (or received textual input) may make reference to one or more entities. An entity is a real word person, place, thing, etc. Entity examples include a specific individual, city, state, song title, band name, restaurant, etc. Each entity is typically unique, such that one John Smith is a different entity from another John Smith, the artist E Street Band is a different entity from the artist Bruce Springsteen, is a different entity from the artist Bruce Springsteen and the E Street Band, etc. When an input is received that refers to an entity the system needs to first determine that the text (either received directly or obtained from the speech) actually refers to an entity. This process is called named entity recognition (NER). Once the system determines that an entity is referred to, the system then determines which entity is referred to. This process is called entity resolution, entity linking, or record linking NER and entity resolution may be considered part of NLU. Entity resolution ensures that an input is processed to refer to the correct entity, thus ensuring that when a user commands the system to "call John", "play the boss", or the like, the system calls the right "John", correctly interprets "the boss" as Bruce Springsteen, etc. Such different ways of referring to a same entity may be referred to as spoken form variants.

To correctly process a spoken input, a system should correctly perform both ASR and NLU, including NER where applicable. In certain situations the system may not be able to process the utterance to be sufficiently confident in what was spoken and/or intended. In such situations the user may be prompted to re-speak the command. Alternatively, sometimes a system may process a spoken utterance in multiple potentially correct ways, but may not be sufficiently confident in any one particular solution to select a single correct answer. The potentially correct answers, called hypotheses, may result from different potential ASR results, different potential NLU results (including different NER results) or some combination thereof. Each ASR hypothesis may include the potential text that the system has determined may correspond to the utterance as well as potential related data (including a ranking of the ASR hypothesis relative to other hypotheses generated from the same utterance, a confidence score of the hypothesis, etc.) When multiple hypotheses are generated, the system may select from among the multiple potential hypotheses for further selection processing that will result in one of the hypotheses to be selected as the correct hypothesis. Such a process is called disambiguation. For example, multiple hypotheses may be returned to the user to allow the user to select the intended hypothesis. As one example, if a user speaks an utterance "where can I find some ice cream," the system may provide a user with a display screen along the lines of:

Did you intend:
    Find some ice cream
    Find some I scream
    Find some eyes cream The user may then select the hypothesis that corresponds to the user's intent. As a second example, if a user speaks an utterance "play the cure," the system may provide a user with a display screen along the lines of:

Did you intend:
    Play the videogame entitled "The Cure"
    Play music by the band "The Cure"
    Play the album "The Cure"

The choices in the second example call for potentially different actions (launching a videogame application versus launching a music playing application) and also refer to different entities that would be the subject of the action (the videogame, the band or the album). If the system is unsure which command the user intended, the disambiguation step allows the user to select from a number of ASR hypotheses to ensure proper processing of the spoken utterance.

In certain situations, however, the choices offered to a user during disambiguation may have no functional difference from each other. Such choices may be the result of, for example, multiple different textual representations of a single entity, spelling errors, etc. For example, if a user speaks an utterance "show me a picture of spider man," the system may provide a user with a display screen along the lines of:

Did you intend:
   Show a picture of Spider-Man
   Show a picture of Spiderman
   Show a picture of Spider Man These examples would all result in a similar action (displaying of a picture) of the same entity (Spider-Man). Certain processes of the system, such as the ASR components, may not recognize that the three different textual representations ("Spider-Man," "Spiderman" and "Spider Man") all have the same semantic interpretation and all refer to the same entity. Thus the system may present all three as different options to the user during disambiguation. This may result in user frustration, as the user will realize that there is no difference between the commands, but the user still has to make a choice among them, instead of the system simply executing the command associated with the utterance and delivering the results to the user without further user input.

To improve processing of spoken utterances, a system may employ a two-stage configuration where speech results are processed two different times, a first time to determine whether disambiguation should be performed for the particular utterance and a second time to determine, if disambiguation is to be performed, what hypotheses should be presented to the user for disambiguation. Each processing point may use a model configured using machine learning techniques. A first model may be trained to determine whether speech processing results should be disambiguated before passing results to be executed. A second model may be trained to determine what potential speech processing results should be displayed for user selection (if any), following selection of disambiguation by the first model. A system for operating this improvement is illustrated in FIG. 1A.

As shown in FIG. 1A, a system 100 may include a user's mobile device 110 connected to one or more servers 120 across network(s) 199. The server(s) 120 are capable of performing ASR and NLU processing as described herein. A single server may be capable of performing all speech processing or multiple server(s) 120 may combine to perform the speech processing. Further, the server(s) 120 may be configured to execute certain commands, such as commands spoken by user 10. In addition, certain speech processing or command execution functions may be performed by device 110.

A user 10 may speak an utterance including a command. The user's utterance is captured by a microphone of device 110. The system may then determine (152) audio data corresponding to the utterance, for example as a result of the microphone converting the sound to an audio data signal. The system may then perform (154) ASR processing on the audio data, for example using techniques described below. The system may then process (156) the ASR results with a first model to determine if disambiguation of ASR hypotheses is desired. The first model may be trained to determine, using confidence scores corresponding to a plurality of ASR hypotheses, whether to select a single ASR hypothesis or whether to perform further selection from among the plurality of ASR hypotheses. If disambiguation is desired, the system may process (158) ASR results with a second model to determine what hypotheses should be selected for disambiguation. The second model may be trained to determine, also using confidence scores, which of the plurality of ASR hypothesis to select for disambiguation. The system may then display (160) the hypotheses by the second model. For example, the system may display the hypotheses to a user on device 110. The user may then select one of the hypotheses for execution by the system. The system may then receive (162) an indication of the selected hypothesis, such as an indication that the user touched a touchscreen location corresponding to the selected hypothesis. The system may then perform (164) NLU processing on the selected hypothesis and perform (166) an operation corresponding to the selected hypothesis. For example, executing a particular search request as expressed in the utterance. In various implementations the steps illustrated in FIG. 1A may occur in a different order. For example, NLU processing (164) may be performed before or in parallel with the disambiguation steps 156-162.

To further improve the processing of spoken utterances, the semantic interpretation or other downstream interpretation of the different potential hypotheses may be determined prior to the actual disambiguation and then used to determine which choices are actually displayed to the user. For example, if an utterance includes a search command, the different potential ASR hypotheses corresponding to the utterance (and/or their corresponding NLU output) may be sent to a search engine to determine the results of the search. If two or more potential ASR results would ultimate lead to semantically similar search results, one of the ASR results may be removed from the disambiguation results. A system for operating this improvement is illustrated in FIG. 1B.

FIG. 1B shows a similar system to FIG. 1A. In this system, utterances may be captured and processed similarly to that as described in FIG. 1A, however the system of FIG. 1B may or may not operate the first model and second model described above. As illustrated in FIG. 1B, after the system performs (154) ASR processing on the audio data, the system determines (170) ASR hypotheses for disambiguation. Prior to disambiguation, the system may determine (172) NLU results for the ASR hypotheses, and/or the system may determine a downstream command that would be executed by each hypotheses. For example, if the NLU results include search requests, a search engine may execute the requests and make the search results available to a component that compares the NLU results as described below. The system, through that component, may then determine if the NLU results or downstream commands for any of the hypotheses are similar, for example if any of the hypotheses would result in the same (or a similar) ultimate result for the user. One specific example of this would be if a first hypothesis was "who is Spider-Man" and a second hypothesis was "who is spiderman." The system may determine that both the first and second hypotheses would result in the same search function being executed by the system and the same search results returned to the user. (Alternatively, the system may determine that the function/results are not identical, but are similar enough to not display both choices to the user.) The system may then remove (174) from consideration one or more hypotheses that have similar results to other hypotheses. The system may then disambiguate the remaining hypotheses by displaying (161) them to a user and receiving (162) an indication of the selected hypothesis. The system may then, if necessary, perform further NLU/command processing of the selected hypothesis. Or, since such processing may have been performed earlier as part of the hypothesis pruning prior to disambiguation, the system may simply perform (166) the operation associated with the selected hypothesis. As above with FIG. 1A, the steps of FIG. 1B may occur in a different order.

The system 100 of FIGS. 1A and 1B may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone, captures audio corresponding to a spoken utterance 11. An ASR process 250 converts the audio into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the appliance 110 may process audio data into feature vectors and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones,"

but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
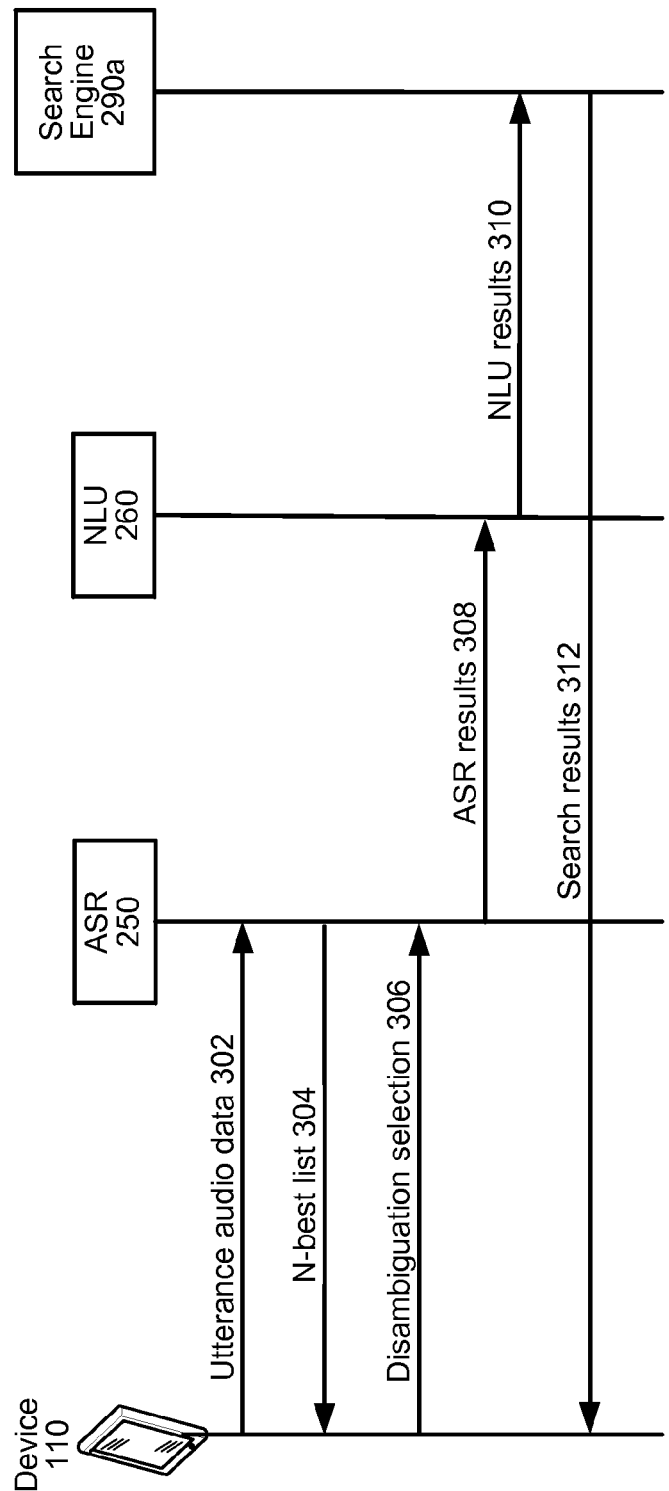
FIG. 3 is a signal flow diagram conceptually illustrating how a spoken utterance may be processed in a search context according to embodiments of the present disclosure.

FIG. 3 illustrates a typical example of processing of a spoken utterance in the context of a search request. For purposes of the present illustration, the utterance may include a search request. As illustrated, processing of the utterance involves a disambiguation scenario. A device 110 detects audio corresponding to an utterance and converts the audio into audio data. The audio data may be raw audio data or processed audio data. For example, the device 110 may be configured with an AFE 256 to create feature vectors for further processing. The audio data may then be sent to an ASR component 250 (302). The ASR 250 may determine an N-best list of certain hypotheses for disambiguation. The ASR 250 may then send (304) that list to the device 110. The device 110 may display the list to a user and receive a command selecting one of the hypotheses. The device 110 may then send (306) the selected hypothesis (or an indication of the selected hypothesis) to the ASR 250. The ASR 250 may then send (308) the selected ASR hypothesis to the NLU component 260. Alternatively the device 110 may send the selected hypothesis (or an indication of same) directly to the NLU component 260. The NLU 260 may perform NLU processing on the selected hypothesis and may determine that it includes a search request. The NLU 260 may then send the NLU results (310) to a search engine component 290a. The search engine 290a may then perform the search and return (312) the search results to the device 110, which may in turn display the results.

In traditional speech processing, such as that illustrated in FIG. 3, a system would use a thresholding configuration to determine whether the N-best list of hypotheses requires disambiguation. That is, the system would determine whether any of the hypotheses has a score above a certain threshold. If not, the top N scoring hypotheses would be included in the N-best list for disambiguation. As noted above, this may lead to user frustration if the disambiguation choices are not sufficiently different. To improve the user experience a two-stage configuration may be used to select disambiguation choices. The two-stage configuration is illustrated in FIG. 4, with stages 404 and 408 representing the two different stages for determining disambiguation choices.

Figure 4:
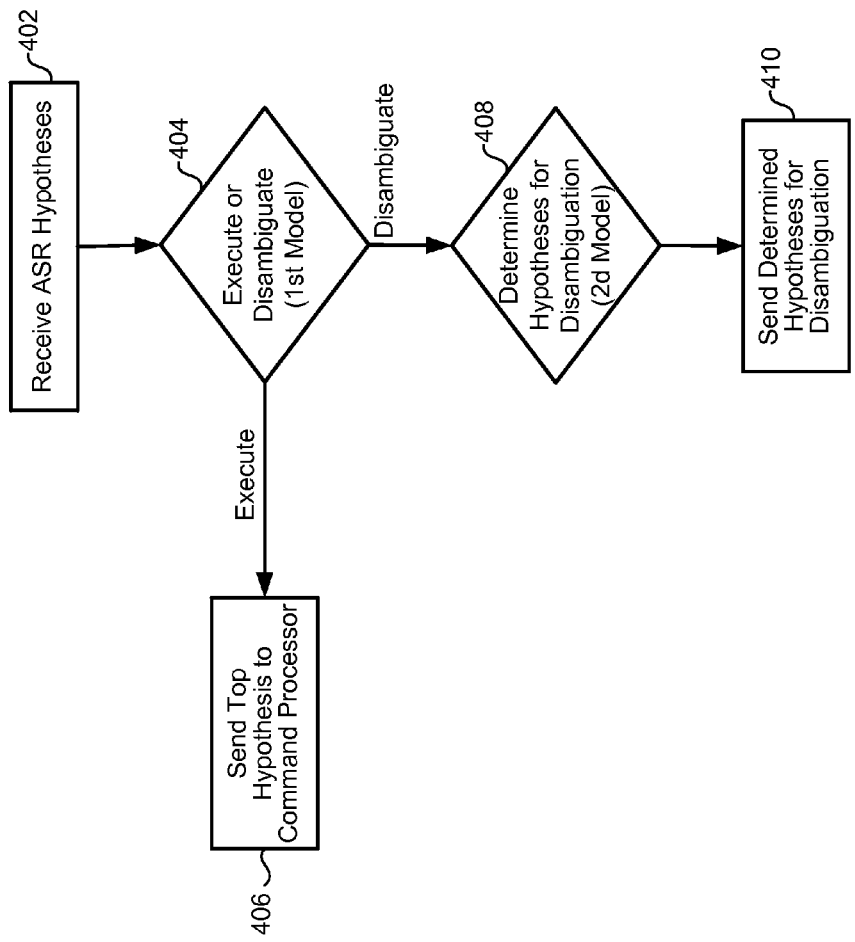
FIG. 4 is a flowchart illustrating how a spoken utterance may be processed according to embodiments of the present disclosure.

The steps of FIG. 4 may be implemented in various components of a system. In one example, the steps may be performed by an ASR component 250. In another example, the steps may be performed by another component or combination of components. After performing traditional ASR (that is, converting audio data to text data), the system may receive (402) the ASR hypotheses. Each hypothesis may also be associated with a score. These hypotheses and respective scores are processed using a first trained machine learning model to determine (404) whether one hypothesis is sufficiently correct (i.e., its score is sufficiently high relative to the remaining hypotheses) that it should be executed, or whether further disambiguation is necessary to determine the correct hypothesis. If the first model determines that execution is called for, the top hypothesis is sent (406) to the appropriate command processor, depending on the command included in the hypothesis (e.g., search, launching an application, etc.). If the first model determines that disambiguation is called for, the hypotheses and respective scores are passed to a component that processes (408) the hypotheses and respective scores with a second trained machine learning model to determine which (if any) hypotheses should be passed on for disambiguation and which (if any) hypotheses should be discarded. The hypotheses that are determined to be passed on are sent (410) for disambiguation, as explained above in reference to FIG. 1A.

Various machine learning techniques may be used to train and/or operate the first model and second model. In machine learning techniques an adaptive system is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. But provided data with consistent patterns, recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

For example, for the first model discussed above, an adaptive system may be trained using example confidence score groups and whether each confidence score group is associated with execution of a top-scoring hypothesis or selection of the group for disambiguation between the hypotheses. For the second model discussed above, an adaptive system may be trained by repeatedly showing it examples of confidence score groups and whether each confidence score in the group should be removed or included in the group for disambiguation. Further details of training the first and second models are detailed below.

Such machine learning techniques may include, for example neural networks, inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers (either binary or multiple category classifiers) may issue a "score" indicating which category the data most closely matches. The score may provide an indication of how closely the data matches the category.

Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the models.

For purposes of training the first model (which may be a classifier, SVM, or other model) used to decide between command execution and disambiguation, a 4 (or 5 as described below)×N matrix $X_1$ may be configured where N is the number of training utterances. Each training utterance may be associated with a plurality of training ASR hypotheses. N may be a large number, for example several thousand. The larger N is, the more robust the first model is, and the better the first model may perform in processing incoming utterances. The first model may be a SVM or other machine learning model. Each row of $X_1$ is associated with a single training utterance. Each row may include the ordered confidence scores of the different training ASR hypotheses corresponding to the particular training utterance. Thus, for example, a row may include a confidence score group comprising four confidence scores [$C_1$ $C_2$ $C_3$ $C_4$] where $C_1$ is associated with the highest scoring training ASR hypothesis for the training utterance, $C_2$ is associated with the second highest scoring training ASR hypothesis for the training utterance, $C_3$ is associated with the third highest scoring training ASR hypothesis for the training utterance and $C_4$ is associated with the second highest scoring training ASR hypothesis for the training utterance. Although four confidence scores are used in the illustrated example, other numbers of confidence scores may also be used both in training the first model and in training the second model (discussed below). Each row of $X_1$ is also associated with, and may include, a particular ground truth training label, which may be either "disambiguate," for utterances that should be disambiguated prior to execution or "execute," for utterances where the highest scoring hypothesis is correct and should be executed, for example sent to a command processor for further operation. An example matrix $X_1$ is illustrated below:

$$X_1 = \begin{bmatrix} 0.34 & 0.22 & 0.21 & 0.18 & \text{disambiguate} \\ 0.66 & 0.13 & 0.11 & 0.08 & \text{execute} \\ \vdots & \vdots & \vdots & \vdots & \vdots \end{bmatrix}$$

Thus the first model may be trained on different confidence score combinations. At runtime the system may process the hypotheses and respective confidence scores using the trained first model for an utterance to determine whether the hypotheses should be disambiguated or whether a single hypothesis should be selected for execution. The machine learning techniques may determine what situations and relationships between confidence scores should result in a selection of "disambiguate" and what should result in a selection of "execute." Those relationships may be incorporated into the first trained model as part of the training. The first model may then be used to process new utterance hypotheses and their respective confidence scores.

The second model (which may also be a classifier, SVM, or other model) is trained using a matrix $X_2$, which includes all the utterances labeled "disambiguate" from the first training set, that is all the rows that are labeled "disambiguate" from $X_1$. Thus $X_2$ may be a 5 (or 6 as described below)×4M matrix, where M is the number of utterances labeled "disambiguate" from $X_1$. $X_2$ has 4M rows because $X_2$ includes one row for each training ASR hypothesis, rather than one row for each training ASR utterance like $X_1$. For each training ASR hypothesis, an $X_2$ row includes a confidence score group including five confidence scores [$C_H$ $C_1$ $C_2$ $C_3$ $C_4$] where $C_H$ is the confidence score of the training ASR hypothesis corresponding to that row and $C_1$-$C_4$ are the four confidence scores for the highest scoring training ASR hypotheses of the utterance of the row. Thus, $C_H$ will be one of $C_1$-$C_4$. Each row is also associated with, and may include, a particular ground truth training label, which may be either "filter" or "show." "Filter" may be used if the particular training ASR hypothesis of the row is incorrect (i.e., does not match the reference transcript of the training utterance, duplicative of one or more training ASR hypotheses, or otherwise should not be included in the disambiguation choices. "Show" may be used if the training ASR hypothesis is correct (matches the reference transcript of the training utterance) or otherwise should be included in the disambiguation choices. An example matrix $X_2$ is illustrated below:

$$X_2 = \begin{bmatrix} 0.34 & 0.34 & 0.22 & 0.21 & 0.18 & \text{show} \\ 0.22 & 0.34 & 0.22 & 0.21 & 0.18 & \text{filter} \\ 0.21 & 0.34 & 0.22 & 0.21 & 0.18 & \text{show} \\ 0.18 & 0.34 & 0.22 & 0.21 & 0.18 & \text{show} \\ \vdots & \vdots & \vdots & \vdots & \vdots & \vdots \end{bmatrix}$$

As can be seen with the example $X_2$, the first four rows of $X_2$ are from the training utterance labeled "disambiguate" in the example $X_1$ above. The first row of $X_2$ corresponds to the first training ASR hypothesis of the training utterance, such that $C_H$ of the first row (0.34) corresponds to $C_1$ of the first row. The second row of $X_2$ corresponds to the second training ASR hypothesis of the training utterance, such that $C_H$ of the second row (0.22) corresponds to $C_2$ of the second row. The third row of $X_2$ corresponds to the third training ASR hypothesis of the training utterance, such that $C_H$ of the third row (0.21) corresponds to $C_3$ of the third row. The fourth row of $X_2$ corresponds to the fourth training ASR hypothesis of the training utterance, such that $C_H$ of the fourth row (0.18) corresponds to $C_4$ of the fourth row. As shown, the second row is associated with the training label "filter" where the other rows are associated with the training label "show." Thus, for the first training utterance, the first, third and fourth training ASR hypotheses would be included in a disambiguation group but the second training ASR hypothesis would not. The values of the training labels "filter" or "show" may be determined based on the reference transcript, that is whether each particular training ASR hypothesis in question is a valid representation of the audio corresponding to the training utterance. The training labels may be estimated by assessing whether the query matches a human transcript, or whether the content retrieved by that query matches the user's intent for the training utterance. For the training examples, as at runtime, it is possible for anywhere from zero to all training ASR hypotheses of a particular utterance being selected as "show" to be shown to a user for disambiguation. If zero are selected at runtime a user may be prompted to restate the utterance.

Thus the second trained model may be trained on many different potential disambiguation choices knowing each choices individual training ASR hypothesis confidence score ($C_H$) relative to the confidence scores of the other training ASR hypotheses for the same utterance ($C_1$-$C_4$). The machine learning techniques may determine what situations and relationships between confidence scores should result in a selection of "filter" and what should result in a selection of "show." Those relationships may be incorporated into the second trained model as part of the training. The second model may then be used to process potential disambiguation hypotheses and their respective confidence scores. Although the particular machine learning techniques and training set may ultimately determine the operation of the second model, one potential result of considering disambiguation choices in this manner is that the second model may determine that in certain situations, where a first hypothesis has a confidence score very close to a confidence score for a second hypothesis of the same utterance, the first hypothesis should be selected as "show" but the second hypothesis should be selected as "filter," thus resulting in the first hypothesis being included as a disambiguation choice but the second hypothesis not being selected.

Although the matrices $X_1$ are illustrated above with confidence scores ranging from 0 to 1, a variety of different confidence score ranges and configurations may be used. Further, $X_1$ and $X_2$ may be normalized prior to training. For example, $X_1$ may be normalized using the mean and standard deviation of the training set whereas $X_2$ may be normalized using the mean and standard deviation of the subset of the training set that was labeled "disambiguate" relative to $X_1$.

Although the first and second model are illustrated above as being trained on confidence scores, other features related to the training hypotheses may be considered when training the first and second models. Features may include descriptors that describe some aspect of each hypothesis. For example, text features of the individual hypotheses may be included such as features describing a hypothesis, cross-hypotheses features (e.g., whether an "s" sound at the end of the word is the only difference between two hypotheses), etc. Further, as mentioned below, a model may also be trained using an ultimate result of the command associated with a particular hypothesis, such as an entity identifier associated with a search command result. The entity identifier may be a feature for present purposes. Hypotheses having overlapping results may result in a certain hypothesis being discarded for purposes of either determining whether to disambiguate using the first model to the selection of potential hypotheses to show using the second model. Another example of a feature is a quantitative measurement of the difference and/or "distance" from the text of one hypothesis to the text of another, as known in the art.

As can be appreciated, the selection of the training set, with its utterances, hypotheses, confidence scores and ground truths, will impact the ultimate results of operating the first model and second model at runtime. Thus selection of the training set, as well as the machine learning techniques, selected machine learning parameters, etc. will impact the runtime operation of the system. In particular, these variables may be adjusted to arrive at a desired balance between reduced disambiguation and correct results. As known in the art, variables such as error cost may be adjusted to tune the models. For example, an error of excluding a potentially relevant hypothesis may cost a first amount whereas an error of including a potentially irrelevant hypothesis may cost a second amount. The training algorithm may then tune a decision boundary to reduce the specified error costs. A number of such techniques are known in the art of machine language model training. For example, the first model and second model may be tuned to achieve an overall error rate of approximately below 20% while also achieving a disambiguation percentage (that is a total number of utterances selected for disambiguation) of approximately between 20-35%, or approximately below 20%. These rates may be different depending on if models are constructed for particular domains, if additional testing suggests other tuning to improve performance, or other factors.

As mentioned above, one way to significantly increase the number of correct results is to select disambiguation for each utterance received by the system. This will increase the number of correct commands executed in response to the utterance (as the user will have multiple choices each time) but this will also increase the user's frustration as the system would require additional user input after each utterance. Thus the system (including the first model and second model) may be tuned to reduce the overall speech processing error rate while also reducing the number of received utterances are sent for disambiguation. The overall error rate ($E_{overall}$) may be considered to be the number of times incorrect hypotheses are sent directly to command execution without disambiguation ($E_{direct}$) plus the number of times disambiguation occurs without a correct hypothesis included as one of the disambiguation choices ($E_{disamb}$) divided by the total number of utterances. Thus:

$$E_{overall} = \frac{E_{direct} + E_{disamb}}{|utterances|}$$

To expand on the expression of $E_{overall}$, particularly in the context of reducing the number of disambiguations, let $H_i$ be the group of ASR hypotheses for utterance i and let $M_{1\text{-}direct}$ (Hi) be the first model, that is the model that predicts whether a first hypothesis for an utterance is sent direct to command execution or to disambiguation. Thus:

$$M_{1\text{-}direct}(H_i) = \begin{cases} 1 & \text{if direct to command execution} \\ 0 & \text{if not direct to command execution} \end{cases}$$

Similarly, let $H_i(j)$ be a particular hypothesis j for the group of hypotheses $H_i$ and let $M_{2\text{-}disamb}$ be the second model, that is the model that predicts whether a particular hypotheses is selected (i.e., marked "show") for disambiguation. Thus:

$$M_{2\text{-}disamb}(H_i[j]) = \begin{cases} 1 & \text{if } H_i[j] \text{ is shown} \\ 0 & \text{if } H_i[j] \text{ is not shown} \end{cases}$$

Let $T_i$ be a truth indicator function for whether a particular hypothesis matches the reference transcript for a particular utterance in the training set (indicating that the particular hypothesis is correct) such that $T_i=1$ when the hypothesis is correct and $T_i=0$ when the hypothesis is not correct. Thus:

$$T_i(H_i[j]) = \begin{cases} 1 & \text{if } H_i[j] = \text{reference} \\ 0 & \text{otherwise} \end{cases}$$

Using these expressions the errors may be defined as follows:

$$E_{direct} = |\{M_{1\text{-}direct}(H_i) = 1 \wedge T_i(H_i[0]) \neq 1\}|$$

$$E_{disamb} = \left|\left\{M_{1\text{-}direct}(H_i) = 0 \wedge \max_{j|M_{2\text{-}disamb}(H_i[j])=1} T_i(H_i[j]) = 1\right\}\right|$$

For desired system operation, the training parameters may be selected so that $E_{overall}$ is reduced while at the same time reducing the number of utterances for which disambiguation is performed.

The system incorporating the first model and second model is described above using the example of processing hypothesis confidence scores, both to train the models and to determine at runtime whether to process a hypothesis or select certain hypotheses for disambiguation. The system, however, is not so limited. Any feature of a hypothesis may be used both to train the first and/or second model and then to make runtime determinations based on the trained models. Such features may include confidence scores, other scores, an edit distance between hypotheses, other indication(s) of a quality of a hypothesis, a feature(s) describing the set of hypotheses, individual words of a hypothesis, or the like. The system incorporating the first and second trained models may thus use a number of features for model training and runtime operation.

With the first model and second model trained, the system may use them at runtime to make disambiguation/execution decisions for incoming utterances and corresponding hypotheses as described above in reference to FIG. 1A. Further, as described in reference to FIG. 1B, the system may incorporate ultimate results corresponding to a particular ASR hypothesis in order to improve the process of disambiguation among ASR hypotheses.

Figure 5:
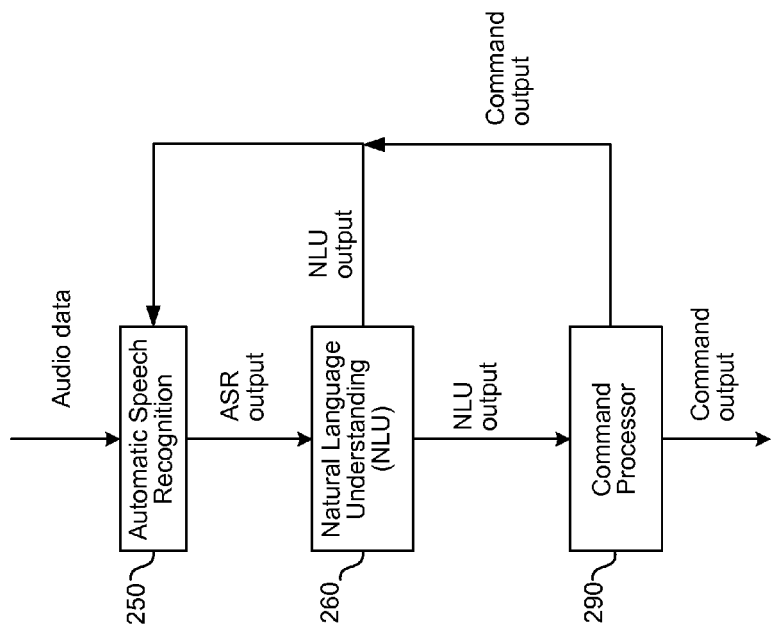
FIG. 5 illustrates components for processing a spoken utterance according to embodiments of the present disclosure.

As may be appreciated, in order to improve disambiguation using utterance command results as illustrated in FIG. 1B, an ASR or similar component must have access to the command results prior to displaying the disambiguation choices to a user. An example of such a system is illustrated in FIG. 5. As shown in FIG. 5, audio data is input into an ASR component 250. The audio data includes data corresponding to an utterance. The ASR output is input into an NLU component 260. The ASR output may include text associated with different hypotheses of an N-best list of potential text transcriptions corresponding to the utterance. The NLU component 260 then semantically tags and/or otherwise operates on the text of the different hypotheses to create the NLU output, which may include processed text for each hypothesis of the N-best list. The NLU output is output to a command processor 290 which then creates command output for each hypothesis of the N-best list. The command output may be formatted so that the command output may be executed by another component (such as a device 110, server 120, etc.).

One difference between traditional ASR systems and the system of FIG. 5, however, is that output from the NLU 260 and/or output from the command processor 290 may be fed back into the ASR component 250. This is so the ASR component 250 can determine whether there is any similarity between the ultimate command results for each individual hypothesis. If command results are similar, the ASR component 250 may remove one or more hypotheses from the N-best list prior to sending the individual hypotheses of the N-best list for disambiguation. In the system the output from the NLU 260 and/or the command processor 290 that is sent for purposes of altering the N-best list prior to disambiguation may be the normal output from such components 260 and/or 290 or the output may be specially configured for purposes of altering the N-best list. For example, while a command processor 290 may normally output a command to be executed, the output from the command processed back to the ASR 250 (or is otherwise used to alter the N-best list) may be a command output that does not include the entire command but rather some indication of what the ultimate command results may be. Using a specific example, if the command processor is a component such as a search engine, the command output sent back to the ASR may including an indicator of the entities found by the search results. That indicator may include one or more entity identification numbers, for example Amazon Standard Identification Numbers (ASIN) for products in a product search, identifiers for songs in a product search, International Standard Book Numbers (ISBN) for books in a book search, etc.

A single hypothesis may be associated with command results, which may include an indication of an entities associated with the results. Those entities may be determined, for example, using NER techniques discussed above on the different hypotheses. For example, if a hypothesis includes a search request, the command results for the hypothesis may include multiple indicators for what entities make up the results of the search (such as an indicator for each of the top X number of search result hits). The command results for each hypothesis of an N-best list for a particular utterance may be compared to each other to determine whether the first command results associated with a first hypothesis are similar to the second command results associated with a second hypothesis. While command results may be considered similar if they are identical, the first command results may also be considered similar to the second command results if they have a certain degree of semantic equivalence, if they have a similarity measurement exceeding a certain threshold, or meet some other similarity metric. The threshold similarity is configurable and may depend, for example, on the type of command (search, music play command, etc.), the particular command results, or the like. Machine learning techniques (such as those described above) may be applied to determine and apply similarity thresholds. If the first command results are sufficiently similar to the second command results, either the first command or the second command may be removed from the N-best list and not included in the hypotheses presented to the user for disambiguation. For example, the system may select whichever hypothesis has the higher ASR confidence score to remain in the N-best list and discard the other. Another (lower scoring) hypothesis may be selected to replace the removed hypothesis from the disambiguation group. Or the removed hypothesis may not be replaced.

Similarity or substantial similarity between command results may be determined in a number of ways. In one example, the first command results associated with a first search hypothesis may be considered similar to the second command results associated with a second search hypothesis if 70% of the first command results overlap with the second command results. For comparison between command results, top scoring command results may be used. For example, in the context of search results the top search results may be determined from the highest scoring search results, where each hit or entity of a search result may be associated with a confidence or other score. Alternatively, scores may be determined from a ranked order of the search results. As an example of comparing similarity between search hypotheses, two command/search results may be considered similar if their top A search results have B results in common. For example, if A=3 and B=5, a first command results and second command results may be considered similar if the top 5 results of the first command results and the top 5 results of the second command results have 3 results in common. Thus, a first hypothesis associated with the first command results would be considered semantically similar to a second hypothesis associated with the second command results. Different values for A and B may be used depending on what values obtain the most desirable results. Other examples of similarity metrics may also be used.

Generally the system may be configured so that in as many disambiguation scenarios as possible, when disambiguation is offered, the hypotheses in the disambiguation group are semantically different from one another while at the same time maximizing the likelihood that the user's intent is captured in the disambiguation group. Thus one goal for system training is reducing overlap between the command results of hypotheses within the disambiguation group. In one example, the second model described above to determine disambiguation selections may be further trained on the results of each particular hypothesis. Another goal is for the similarity determination to be relatively computationally cheap, so that similarity between potential command results may be determined quickly so that a revised disambiguation group may be presented to a user with a minimum of lag time in the speech processing pipeline. Then the second model may be configured to incorporate command results in its processing, for example including entity identifiers such as ASINs, etc. Other examples are also possible.

While FIG. 5 illustrates the feedback portions of the NLU output and command output going to the ASR, they may be sent to another component that may compare the command results to determine similarity and determine the hypotheses for disambiguation. For example, a different component (such as the NLU 260, command processor 290, or other component) may receive and process the ASR output, NLU output, and/or command output to determine whether command results for hypotheses in the N-best list are similar. That component may then remove a hypothesis from the N-best list if its results are similar to another component of the N-best list. In another aspect certain components, such as the NLU 260, may be removed from the system. This may occur, for example, in situations where the utterance is captured by a domain or context specific application (such as a search application) where involved NLU processing of an utterance may not be required. In such a situation, ASR output may be passed directly to the command processor 290, without first going to the NLU. Thus certain embodiments of the system may include different configurations of components than those shown, for example, in FIGS. 2-5 without departing from the present teachings.

When the system removes a hypothesis from the N-best list it may create a revised N-best list, including the remaining hypotheses for disambiguation. The remaining hypotheses may be sent to a device for display to a user for disambiguation. Alternatively, only a portion of the remaining hypotheses, or indicators of the remaining hypotheses may be sent. For example, where an individual hypothesis may include an entire sentence of text corresponding to a search request, the disambiguation choices sent to the device and/or presented to the user may only include a list of the different search entities of each particular hypotheses and may not include the text including the search request. For present purposes, use of "hypothesis" or "hypotheses" may include only portions of an individual hypothesis, such as the portion sufficient to distinguish it from other hypotheses of the N-best list associated with the utterance. Alternatively the disambiguation choices sent to the device and/or presented to the user may include examples of the actual results, such as examples of the different search results for individual hypotheses. This may allow the user to simply select the most correct search results.

A revised N-best list may be sent to a device 110 for disambiguation. The user may then select a particular hypothesis as the hypothesis to execute. The system may receive an indication of the selected hypothesis (for example a touch input on a screen location associated with a particular hypothesis). The system may then process a command result associated with the selected hypothesis for execution. As the command results for the selected hypothesis may be available to the system at the time of selection, the system may simply send the command results for the selected hypothesis to the appropriate component for execution. If, however, further processing is to be done on the selected hypothesis prior to execution, the system may send the selected hypothesis and/or data associated with the selected hypothesis to the ASR 250, NLU 260, command processor 290, or other component for processing prior to execution.

In certain situations, a revised N-best list may ultimately include only one hypothesis. This may occur when the other hypotheses of the original N-best list include similar results to the one hypothesis. The other hypotheses may be removed, leaving only one remaining hypothesis in the revised N-best list. In this situation, the system may not return the revised N-best list (including the one remaining hypothesis) for disambiguation, but may simply output the remaining hypothesis for execution by the appropriate component.

As can be appreciated, the feedback configuration, such as that illustrated in FIG. 5, may introduce certain latencies in the system that may delay ultimate command results from reaching the user. Thus, such a system may be best suited for utterance commands whose results may be determined with low latency, to avoid undue delays when presenting the user with command results and/or disambiguation choices. One example of a low latency command process is a search engine that processes and resolves search requests to obtain search results. A search engine, such as Amazon's A9 search, may receive processed utterance data (which may include post-ASR text, post NLU-annotated text, or other data) and return potential results sufficiently quickly to allow the system to incorporate those results when determining what potential hypotheses to present to a user without significantly increasing the latency from receiving the utterance to presentation of disambiguation choices (or command execution where appropriate).

Figure 6:
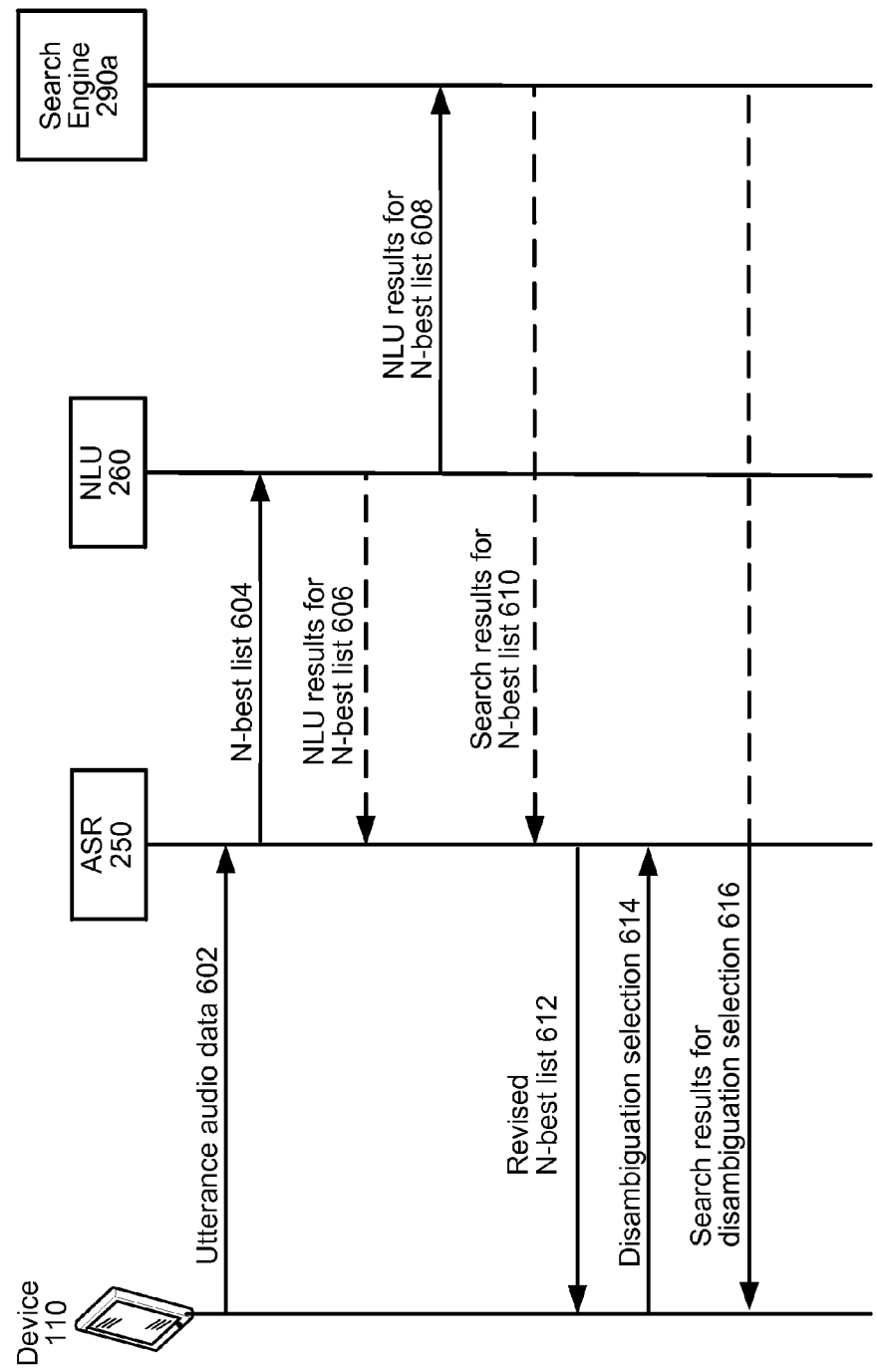
FIG. 6 is a signal flow diagram conceptually illustrating how a spoken utterance may be processed in a search context according to embodiments of the present disclosure.

FIG. 6 illustrates a signal flow diagram illustrating utterance processing with improved disambiguation according to the system illustrated in FIG. 1B in the context of an utterance including a search request. As shown, a device 110 may send (602) utterance audio data to an ASR 250. The ASR 250 may then determine an N-best list of hypotheses, and their corresponding scores, that may correspond to the utterance. The ASR 250 may send (604) the N-best list to an NLU 260. The NLU may then process the hypotheses of the N-best list to determine NLU results associated with each hypothesis. The NLU 260 may send (606) the NLU results back to the ASR 250. The NLU 260 may send (608) the NLU results to a search engine 290*a*. The search engine 290*a* may send (610) the search results for each hypothesis of the N-best list to the ASR 250 (or other component). The ASR 250 (or other component) may then determine any similarity between hypotheses of the N-best list. Any hypotheses that have similar search results to other hypotheses of the N-best list may be removed so that the N-best list only includes hypotheses that have dis-similar search results from the remaining hypotheses of the revised N-best list. The revised N-best list, including the remaining hypotheses, may be sent (612) to the device 110 for disambiguation. The device 110 may receive an indication of a disambiguation selection, that is a selected hypothesis from the revised N-best list. The ASR 250 (or search engine 290*a* or other component) may then send the results of the search of the selected hypothesis to the device 110.

Figure 7:
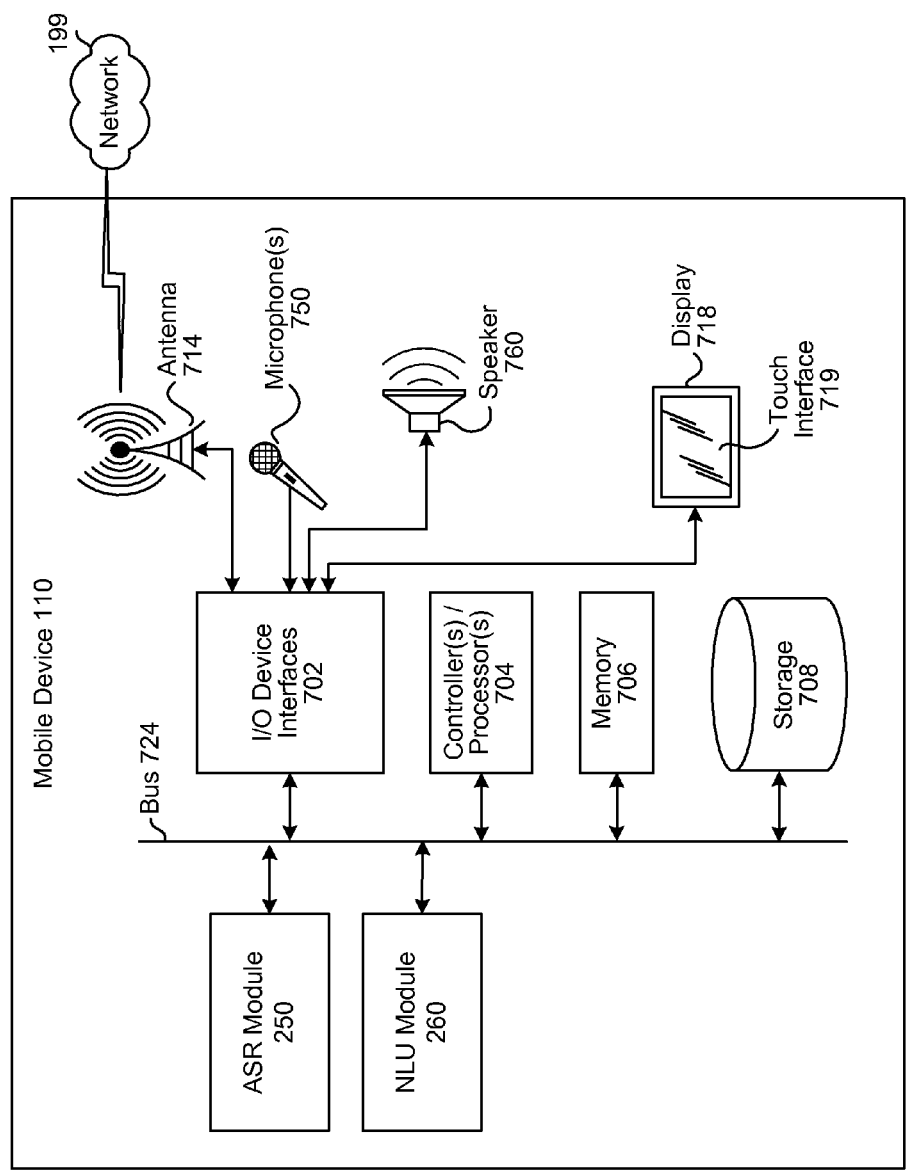
FIG. 7 is a block diagram conceptually illustrating example components of a device according to embodiments of the present disclosure.
Figure 8:
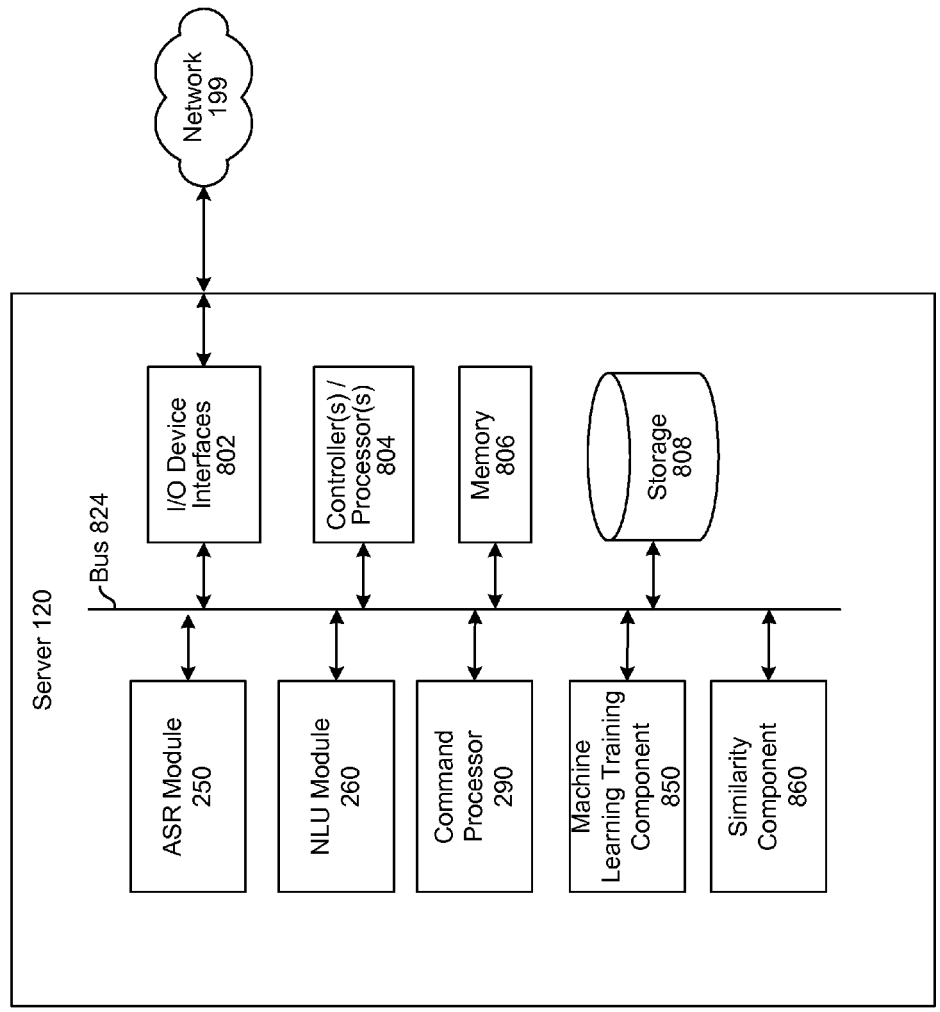
FIG. 8 is a block diagram conceptually illustrating example components of a server according to embodiments of the present disclosure.

FIG. 7 is a block diagram conceptually illustrating a local device 110 that may be used with the described system and may incorporate certain speech receiving/processing capabilities. FIG. 8 is a block diagram conceptually illustrating example components of a remote device, such as a remote server 120 that may assist with ASR, NLU processing, or command processing. Server 120 may also assist in determining similarity between ASR hypothesis results as described above. Multiple such servers 120 may be included in the system, such as one server 120 for ASR, one server 120 for NLU, etc. In operation, each of these devices may include computer-readable and computer-executable instructions that reside on the respective device (110/120), as will be discussed further below.

Each of these devices (110/120) may include one or more controllers/processors (704/804), that may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive (MRAM) and/or other types of memory. Each device may also include a data storage component (708/808), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces, as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to the mobile device 110 of FIG. 7, the input/output device interfaces 702 connect to a variety of components such as an audio output component such as a speaker 760, a wired headset or a wireless headset (not illustrated) or an audio capture component. The audio capture component may be, for example, a microphone 750 or array of microphones, a wired headset or a wireless headset (not illustrated), etc. If an array of microphones is included, approximate distance to a sound's point of origin may be performed acoustic localization based on time and amplitude differences between sounds captured by different microphones of the array. The microphone 750 may be configured to capture speech including an utterance. The mobile device 110 (using microphone 750, ASR module 250, etc.) may be configured to determine audio data corresponding to the utterance. The mobile device 110 (using input/output device interfaces 702, antenna 714, etc.) may also be configured to transmit the audio data to server 120 for further processing.

For example, via the antenna(s), the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The mobile device 110 and/or server 120 may include an ASR module 250. The ASR module in mobile device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as wake words of the device, whereas extended speech recognition may be configured to recognize a much larger range of words.

The mobile device 110 and/or server 120 may include a limited or extended NLU module 260. The NLU module in mobile device 110 may be of limited or extended capabilities. The NLU module 260 may comprising the name entity recognition module 262, the intent classification module 264 and/or other components. The NLU module 260 may also include a stored knowledge base 272 and/or entity library 282, or those storages may be separately located.

One or more servers 120 may also include a command processor 290 that is configured to execute commands associate with an ASR hypothesis as described above. One or more servers 120 may also include a machine learning training component 850 that is configured to train the first model and second model discussed above. One or more servers 120 may also include a similarity component 860 that is configured to compare results corresponding to particular ASR hypotheses for purposes of determining semantic or other similarity between ASR hypotheses as described above in reference to selecting ASR hypotheses for disambiguation.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 7 and 8, are exemplary, and may be located a stand-alone device or may be included, in whole or in part, as a component of a larger device or system.

Figure 9:
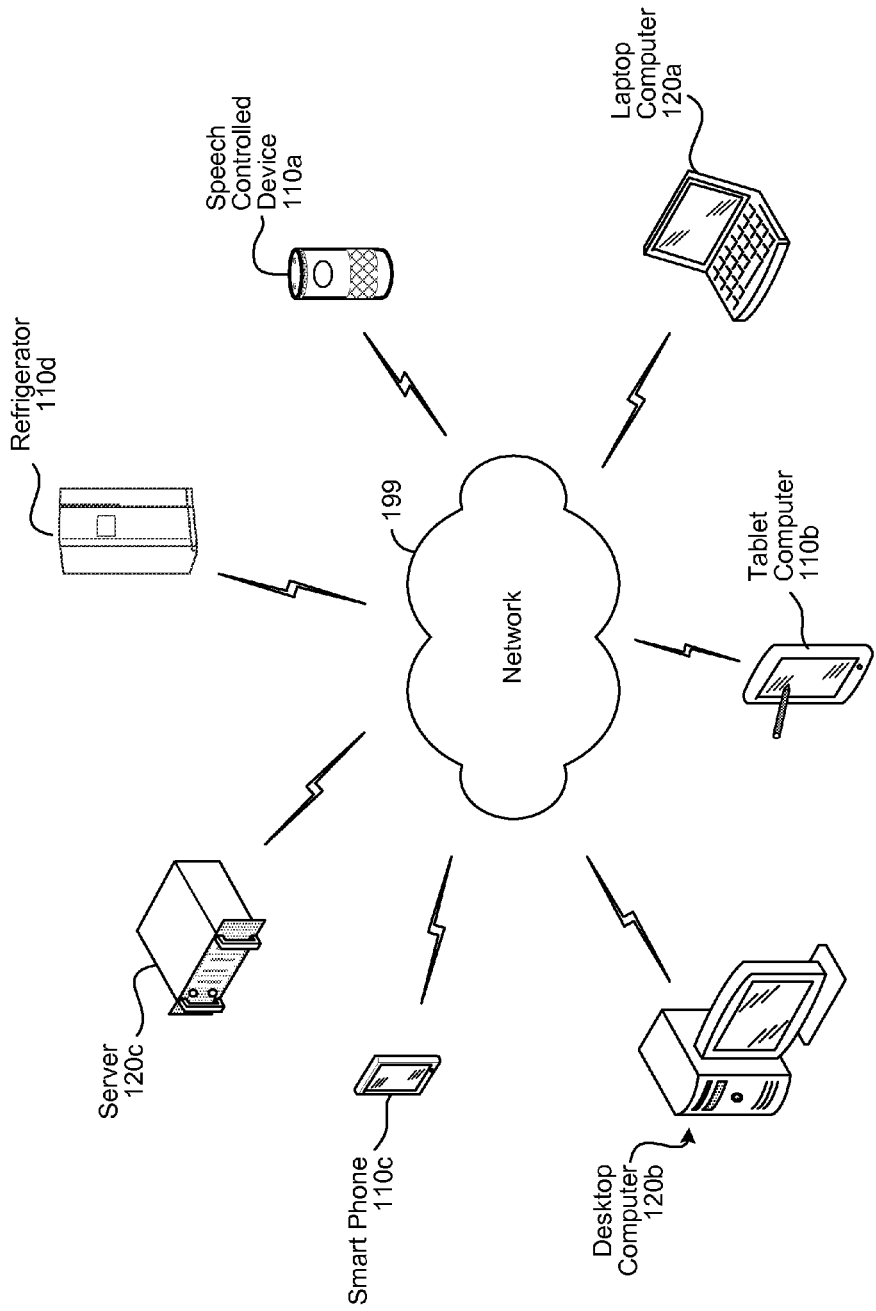
FIG. 9 illustrates an example of a computer network for use with the system.

As illustrated in FIG. 9, multiple devices (110*a* to 110*c*) may contain components of the system 100 and the devices may be connected over a network 1002. Network 199 may include a local or private network or may include a wide network such as the internet. Devices may be connected to the network 199 through either wired or wireless connections. For example, a speech controlled device 110*a*, a tablet computer 110*b*, a smart phone 110*c*, and a refrigerator 110*d* may be connected to the network 199 through a wireless service provider, over a WiFi or cellular network connection or the like. Other devices are included as network-connected support devices, such as laptop computer 120*a*, desktop computer 120*b*, and a server 120*c*. The support devices may connect to the network 199 through a wired connection or wireless connection. Networked mobile devices 110 may capture audio using one-or-more built-in or connected microphones 750 or audio capture devices, with processing performed by ASR, NLU, or other components of the same device or another device connected via network 199, such as an ASR 250, NLU 260, etc. of one or more servers 120*c*.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A method for performing automatic speech recognition (ASR) processing on an utterance using trained classifiers, the method comprising:
   determining a first classifier, wherein the first classifier is trained to determine, using confidence scores corresponding to a plurality of ASR hypotheses, whether to select a single ASR hypothesis or whether to perform further selection from among the plurality of ASR hypotheses;
   determining a second classifier, wherein the second classifier is trained to determine, using the confidence scores, which of the plurality of ASR hypothesis to select for disambiguation;
   receiving, from a mobile device, audio data corresponding to an utterance;
   performing ASR processing on the audio data to generate a first ASR hypothesis corresponding to a first confidence score, a second ASR hypothesis corresponding to a second confidence score and a third ASR hypothesis corresponding to a third confidence score;
   processing, using a processor, the first confidence score, the second confidence score and the third confidence score using the first classifier to output an indication indicating the first ASR hypothesis, the second ASR hypothesis and the third ASR hypothesis for further processing;
processing, using a processor, the first confidence score, the second confidence score and the third confidence score using the second classifier to output an indication that the first ASR hypothesis and second ASR hypothesis are selected for disambiguation;
sending the first ASR hypothesis and the second ASR hypothesis to the mobile device for disambiguation; and
receiving a selection from the mobile device, the selection indicating the first ASR hypothesis.

2. The method of claim 1, further comprising:
training the first classifier using a first plurality of first confidence score groups, wherein:
  each first confidence score group is associated with a training utterance,
  each first confidence score group includes a plurality of confidence scores,
  each confidence score of the first confidence score group is associated with a training ASR hypothesis corresponding to the respective training utterance, and
  each first confidence score group is labeled for either (a) selecting a highest scoring training ASR hypothesis associated with the associated training utterance or (b) selecting a plurality of training ASR hypotheses associated with the training utterance for disambiguation; and
training a second classifier using the second plurality of second confidence score groups, wherein:
  each second confidence score group is associated with a candidate training ASR hypothesis,
  each second confidence score group includes a plurality of confidence scores corresponding to different training ASR hypotheses of a same training utterance, and
  each second confidence score group is labeled for either (a) selecting the respective training ASR hypothesis for disambiguation or (b) not selecting the respective training ASR hypothesis for disambiguation.

3. The method of claim 2, further comprising determining the second plurality of second confidence score groups from among the first confidence score groups labeled for (b) selecting a plurality of training ASR hypotheses associated with the training utterance for disambiguation.

4. The method of claim 2, wherein each second confidence score group further comprises an indication of a command result corresponding to the candidate training ASR hypothesis, and wherein training the second classifier comprises considering the command results during training.

5. A method comprising:
receiving audio data corresponding to an utterance;
performing speech processing on the audio data to generate:
a first hypothesis corresponding to a first feature,
a second hypothesis corresponding to a second feature, and
a third hypothesis corresponding to a third feature;
processing, using a processor, the first feature, the second feature and the third feature using a first model to identify the first hypothesis, the second hypothesis, and the third hypothesis for further selection; and
processing, using a processor, the first feature, the second feature and the third feature using a second model to select the first hypothesis and second hypothesis for disambiguation.

6. The method of claim 5, further comprising:
sending, to a device, an indication of the first hypothesis and second hypothesis; and
receiving, from the device, an indication of selection of the first hypothesis.

7. The method of claim 6, further comprising:
processing text of the first hypothesis to identify a search query;
executing the search query to determine search results; and
sending the search results to the device.

8. The method of claim 5, wherein each of the first model and the second model is one of a trained classifier, neural network or support vector machine.

9. The method of claim 5, wherein each of the first model and the second model is trained using at least one of adaptive boosting, decision trees and random forest.

10. The method of claim 5, wherein the first feature is a first confidence score, the second feature is a second confidence score and the third feature is a third confidence score.

11. The method of claim 5, further comprising:
training the first model using a first plurality of first confidence score groups, wherein:
  each first confidence score group is associated with a training utterance,
  each first confidence score group includes a plurality of confidence scores,
  each confidence score of the first confidence score group is associated with a training ASR hypothesis corresponding to the respective training utterance, and
  each first confidence score group is labeled for either (a) selecting a highest scoring training ASR hypothesis associated with the associated training utterance or (b) selecting a plurality of training ASR hypotheses associated with the training utterance for disambiguation; and
training the second model using the second plurality of second confidence score groups, wherein:
  each second confidence score group is associated with a candidate training ASR hypothesis,
  each second confidence score group includes a plurality of confidence scores corresponding to different training ASR hypotheses of a same training utterance, and
  each second confidence score group is labeled for either (a) selecting the respective training ASR hypothesis for disambiguation or (b) not selecting the respective training ASR hypothesis for disambiguation.

12. The method of claim 5, wherein:
the first hypothesis is a first search request;
the second hypothesis is a second search request;
the third hypothesis is a third search request, and
the method further comprises:
  determining first search results corresponding to the first search request;
  determining second search results corresponding to the second search request;
  determining third search results corresponding to the third search request; and processing the first search results, the second search results and the third search results using the second model to select the first hypothesis and second hypothesis.

the method further comprises processing an indicator of the first command result, an indicator of the second command result, and an indicator of the third command result using the second model to select the first hypothesis and second hypothesis.

13. A computing system comprising:

at least one processor;

a memory including instructions operable to be executed by the at least one processor to cause the system to perform a set of actions comprising:

receiving audio data corresponding to an utterance;

performing speech processing on the audio data to generate:

a first hypothesis corresponding to a first feature, a second hypothesis corresponding to a second feature, and a third hypothesis corresponding to a third feature;

processing the first feature, the second feature and the third feature using a first model to identify the first hypothesis, the second hypothesis, and the third hypothesis for further selection; and processing the first feature, the second feature and the third feature using a second model to select the first hypothesis and second hypothesis for disambiguation.

14. The computing system of claim 13, wherein the set of actions further comprises:

sending, to a device, an indication of the first hypothesis and second hypothesis; and receiving, from the device, an indication of selection of the first hypothesis.

15. The computing system of claim 14, wherein the set of actions further comprise:

processing text of the first hypothesis to identify a search query;

executing the search query to determine search results; and sending the search results to the device.

16. The computing system of claim 13, wherein each of the first model and the second model is one of a trained classifier, neural network or support vector machine.

17. The computing system of claim 13, wherein each of the first model and the second model is trained using at least one of adaptive boosting, decision trees and random forest.

18. The computing system of claim 13, wherein the first feature is a first confidence score, the second feature is a second confidence score and the third feature is a third confidence score.

19. The computing system of claim 13, wherein the set of actions further comprises:

training the first model using a first plurality of first confidence score groups, wherein:

each first confidence score group is associated with a training utterance, each first confidence score group includes a plurality of confidence scores, each confidence score of the first confidence score group is associated with a training ASR hypothesis corresponding to the respective training utterance, and each first confidence score group is labeled for either (a) selecting a highest scoring training ASR hypothesis associated with the associated training utterance or (b) selecting a plurality of training ASR hypotheses associated with the training utterance for disambiguation; and training the second model using the second plurality of second confidence score groups, wherein:

each second confidence score group is associated with a candidate training ASR hypothesis, each second confidence score group includes a plurality of confidence scores corresponding to different training ASR hypotheses of a same training utterance, and each second confidence score group is labeled for either (a) selecting the respective training ASR hypothesis for disambiguation or (b) not selecting the respective training ASR hypothesis for disambiguation.

20. The computing system of claim 16, wherein:

the first hypothesis is a first search request;

the second hypothesis is a second search request;

the third hypothesis is a third search request, and the set of actions further comprises:

determining first search results corresponding to the first search request;

determining second search results corresponding to the second search request;

determining third search results corresponding to the third search request; and processing the first search results, the second search results and the third search results using the second model to select the first hypothesis and second hypothesis.

\* \* \* \* \*